United States Patent
Blom et al.

(10) Patent No.: US 8,094,817 B2
(45) Date of Patent: Jan. 10, 2012

(54) CRYPTOGRAPHIC KEY MANAGEMENT IN COMMUNICATION NETWORKS

(75) Inventors: Rolf Blom, Jarfalla (SE); Karl Norrman, Stockholm (SE); Mats Naslund, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 916 days.

(21) Appl. No.: 11/857,621

(22) Filed: Sep. 19, 2007

(65) Prior Publication Data

US 2008/0095362 A1 Apr. 24, 2008

Related U.S. Application Data

(60) Provisional application No. 60/829,954, filed on Oct. 18, 2006.

(51) Int. Cl.
*H04L 9/00* (2006.01)

(52) U.S. Cl. ............ 380/44; 380/45; 380/277; 713/150; 713/168; 709/223

(58) Field of Classification Search ................. None
See application file for complete search history.

(56) References Cited

U.S. PATENT DOCUMENTS

| | | | | |
|---|---|---|---|---|
| 7,546,459 B2 * | 6/2009 | Robles et al. | .................. | 713/168 |
| 2004/0068653 A1 * | 4/2004 | Fascenda | ...................... | 713/168 |
| 2005/0044365 A1 * | 2/2005 | Haukka et al. | ................. | 713/171 |
| 2005/0254653 A1 | 11/2005 | Potashnik et al. | | |
| 2006/0251257 A1 * | 11/2006 | Haverinen et al. | ............. | 380/270 |
| 2008/0065884 A1 * | 3/2008 | Emeott et al. | .................. | 713/168 |

OTHER PUBLICATIONS

Ericsson: "Requirements on SAE/LTE AKA", S3-060476, 3GPPP TSG SA WG3 Security—SA3#44, Jul. 11-14, 2006 Tallinn, Estonia, Retrieved from : http://www.3gpp.org (Apr. 11, 2008) .3.3.
Nokia et al: "Updated version of Rationale and track of security decisions in Long Term Evolved RAN/3GPP System Architecture Evolution", 3GPP TSG SA WG3 Security-SA3#44, S3-060564, Jul. 11-14, 2006, Tallin, Estonia, (10.1.4).
Nyberg K: "Chryptographic algorithms for UMTS" In: European Congress on Computational Methods in Applied Sciences and Engineering 2004. Edited by Neittaanmaki et al. Jyvaskyla Jul. 24-28, 2004, System for distributing keys in a cell phone system, abstract.

* cited by examiner

*Primary Examiner* — Ponnoreay Pich (57) ABSTRACT

An authentication server and a system and method for managing cryptographic keys across different combinations of user terminals, access networks, and core networks. A Transformation Coder Entity (TCE) creates a master key (Mk), which is used to derive keys during the authentication procedure. During handover between the different access types, the Mk or a transformed Mk is passed between two nodes that hold the key in the respective access networks when a User Equipment (UE) terminal changes access. The transformation of the Mk is performed via a one-way function, and has the effect that if the Mk is somehow compromised, it is not possible to automatically obtain access to previously used master keys. The transformation is performed based on the type of authenticator node and type of UE/identity module with which the transformed key is to be utilized. The Mk is never used directly, but is only used to derive the keys that are directly used to protect the access link.

22 Claims, 5 Drawing Sheets

CRYPTOGRAPHIC KEY MANAGEMENT IN COMMUNICATION NETWORKS

CROSS-REFERENCE TO RELATED APPLICATIONS

This application claims the benefit of U.S. Provisional Application No. 60/829,954 filed Oct. 18, 2006, the disclosure of which is incorporated herein by reference.

STATEMENT REGARDING FEDERALLY SPONSORED RESEARCH OR DEVELOPMENT: NOT APPLICABLE

REFERENCE TO SEQUENCE LISTING, A TABLE, OR A COMPUTER PROGRAM LISTING COMPACT DISC APPENDIX: NOT APPLICABLE

BACKGROUND OF THE INVENTION

This invention relates to secure communications in communication networks. More particularly, and not by way of limitation, the invention is directed to a system and method for managing cryptographic keys across different combinations of user terminals, access networks, and core networks.

Figure 1:
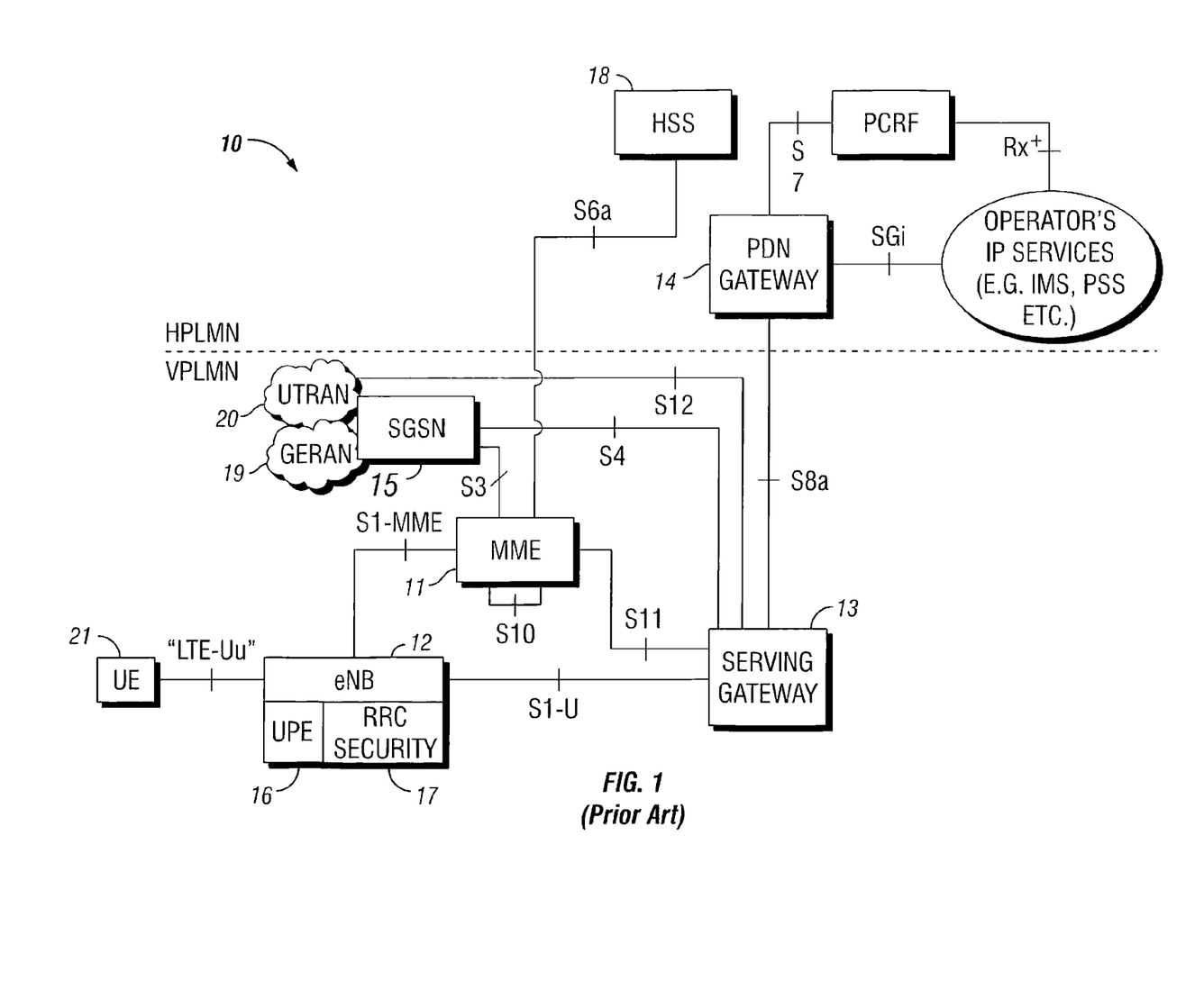
FIG. 1 (Prior Art) is a simplified block diagram of a system architecture for an Evolved Packet System (EPS) architecture comprising an Evolved Packet Core Network (EPC) and an Evolved UTRAN (E-UTRAN) radio access network as currently defined by 3GPP.

FIG. 1 is a simplified block diagram of an evolution of current 3G networks for an Evolved Packet Core network (EPC) and an Evolved UTRAN radio access network (E-UTRAN) as currently defined by the Third Generation Partnership Project (3GPP). The overall evolved system (EPC and E-UTRAN) is referred to as the Evolved Packet System (EPS) 10. Nodes of the EPS architecture, which are important functional entities for the present invention include a Mobility Management Entity (MME) 11 and an enhanced Node B (eNodeB or eNB) 12. For completeness (but not essential to the present invention) it deserves mentioning that there are also two gateway nodes, a Serving Gateway 13 and a Packet Data Network (PDN) Gateway 14. The MME 11 is similar to the control plane of a Serving GPRS Service Node (SGSN) 15, and performs user authentication, terminates Non-Access Stratum (NAS) signaling security, and the like. For the purpose of this description, the eNB 12 can be seen as logically split into two parts. First, a User Plane Entity (UPE) 16 is similar to the user plane of a RNC and SGSN, and terminates UP (User Plane) security. The UPE functionality relevant to the present invention may be implemented in the eNB or elsewhere in the network. The other logical part of the eNB is an entity that terminates Radio Resource Control (RRC) security 17. A Home Subscriber Server (HSS) 18 stores subscriber profile information.

The EPS architecture 10 must interwork efficiently and securely with "legacy" (3GPP Rel6) core network equipment and associated radio access networks such as the GSM/EDGE Radio Access Network (GERAN) 19 and the UMTS Terrestrial Radio Access Network (UTRAN) 20. "Efficiently" means that handover is seamless, and "securely" means that a security compromise in one access network does not spread to other access networks (more than dictated by the need to be backwards compatible). It is assumed that the EPS architecture will use a Rel8-type Subscriber Identity Module (SIM) mechanism in the User Equipment (UE) 21 as the basis for security. Currently, only the use of R99+USIM is specified for EPS, but in one embodiment, the SIM may be an "extended" Subscriber Identity Module/UMTS Subscriber Identity Module (SIM/USIM), hereafter denoted xSIM.

The term "Rel6" refers to equipment of 3GPP Release 6 or earlier. The term "Rel8" is utilized herein to refer to EPC nodes and any UMTS/GSM core network equipment that has been made "EPS aware" and can thus interwork with the EPS architecture. For example, a Rel6 SGSN is assumed to be unable to handover to an EPC node because it does not implement the necessary protocols. However, a Rel8 SGSN is assumed able to do so by implementing the so-called S3 and S4 interfaces.

It is generally agreed in 3GPP that it is desirable for secure communications in the EPS architecture to meet the following requirements:

An enhanced xSIM, if deployed, must be backwards compatible with USIM for UTRAN/GERAN use, and keys must be independent of where an initial authentication takes place (GERAN, UTRAN, or E-UTRAN); authentication parameters shall have the same format; and the like.

The solution must work for all eight combinations of
Rel6 or Rel8 UE
xSIM or USIM
Rel6 or Rel8 SGSN.

It is not required that the solution work with the combination of an Rel6 UE and an eNB/E-UTRAN, as the Rel6 UE simply does not support the radio interface of E-UTRAN.

The solution must work for all combinations involving a Rel8 EPS UE and any of the six configurations of xSIM/USIM, and Rel6 SGSN, Rel8 SGSN, or EPC MME.

The solution must work without any upgrade of the Rel6 RAN or CN equipment. New functions in Rel8 CN equipment are, however, allowed.

If initial attach and handovers (H/O) occur in a Rel8 environment (SGSN and EPC MME), then key separation when going between a UTRAN/GERAN network and an E-UTRAN network must be supported. (Key separation means that exposure of one key does not affect another key.)

The EPS architecture shall support key separation for UP, NAS, and RRC keys.

Exposure of E_UTRAN eNodeB keys shall have limited impact (RRC security re-established at idle-to-active transit).

As an additional requirement, it would be beneficial if the enhanced xSIM could provide "master keys", derived at access authentication, which can be securely used on the application layer even if access keys are exposed. Similarly, it would be desirable if a xSIM could support effective key-sizes above 128 bits.

There is no existing solution that meets all the above requirements. Principles similar to those used for GSM/UMTS interworking cannot be adopted because they do not provide the required level of security. Although GSM and UMTS specify an efficient interworking solution, they do not provide key separation between the accesses and hence a compromise of GSM affects UMTS security to some extent. For instance, the keys provided by GSM/UMTS cannot be re-used on the application layer without a risk of compromise. Additionally, neither GSM nor UMTS provides more than 128-bit security.

What is needed in the art is an efficient and secure system and method for managing cryptographic keys across different combinations of user terminals, access networks, and core networks. The system and method should meet all of the 3GPP EPS requirements. The present invention provides such a system and method and makes provisions for the later introduction of the xSIM satisfying the additional requirements.

BRIEF SUMMARY OF THE INVENTION

The present invention is directed to an authentication server and a system and method for managing cryptographic keys across different combinations of user terminals, access networks, and core networks. The invention has advantages over prior art solutions because it meets all of the 3GPP EPS requirements listed above. It does this primarily by providing key separation between access networks.

In one aspect, the present invention is directed to a method in an authentication server for distributing authentication data to a given authenticator node in a first access network. The given authenticator node is one of a plurality of authenticator nodes of different types in different access networks. The authenticator nodes authenticate different versions of identity modules utilized in a plurality of different versions of mobile terminals. The method includes the steps of generating a master key in the authentication server; cryptographically deriving different authentication data from the master key; and selectively providing the derived authentication data to the authenticator nodes. A key-separation process derives different authentication data, including a transformed key, for each different combination of authenticator node type and identity module version. The method then selectively provides to the given authenticator node, authentication data derived for the combination of the given authenticator node type and the version of identity module being authenticated by the given authenticator node.

In another aspect, the present invention is directed to an authentication server for distributing authentication data to a given authenticator node in a first access network, wherein the given authenticator node is one of a plurality of authenticator nodes of different types in different access networks. The authenticator nodes authenticate different versions of identity modules utilized in a plurality of different versions of mobile terminals. The authentication server includes means for generating a master key; key-separation means for cryptographically deriving from the master key, different authentication data for each different combination of authenticator node type and identity module version; and means for providing to the given authenticator node, authentication data derived for the combination of the given authenticator node type and the version of identity module being authenticated by the given authenticator node.

In another aspect, the present invention is directed to an authenticator node for receiving authentication data from an authentication server and authenticating a mobile terminal. The authenticator node includes means for receiving the authentication data and storing a first key being part of the authentication data; first key-separation means for cryptographically deriving a second key from the first key; and authentication means for authenticating the mobile terminal. The authenticator node also includes means for communicating the second key with a plurality of other authenticator nodes of different types; second key-separation means for cryptographically deriving a third key from the first key; and means for communicating the third key to a security processing node, wherein the security processing node communicates with the mobile terminal utilizing the third key.

In another aspect, the present invention is directed to a system for sharing authentication data between an authentication server and a plurality of authenticator nodes of first, second, and third types in different access networks. The authenticator nodes authenticate different versions of identity modules utilized in a plurality of different versions of mobile terminals. The system includes, in the authentication server, means for generating a master key; first key-separation means for cryptographically deriving from the master key, a different transformed key for each different combination of authenticator node type and identity module version; and means for providing to an authenticator node of a given type, the transformed key derived for the combination of the given type of authenticator node and the version of identity module being authenticated by the given authenticator node. The system includes, in each of the plurality of authenticator nodes, means for receiving a request for authentication data from another authenticator node; and means for transferring the transformed key to the requesting authenticator node.

In one embodiment, the first, second, and third types of authenticator nodes are Release 6 Serving GPRS Service Nodes (Rel6 SGSNs), Release 8 Serving GPRS Service Nodes (Rel8 SGSNs), and EPC Mobility Management Entities (MMEs). Each Rel8 SGSN and MME includes means for cryptographically processing the transformed key before transferring the cryptographically processed transformed key to the requesting authenticator node.

BRIEF DESCRIPTION OF THE SEVERAL VIEWS OF THE DRAWING

In the following, the essential features of the invention will be described in detail by showing preferred embodiments, with reference to the attached figures in which.

DETAILED DESCRIPTION OF THE INVENTION

The present invention is directed to an authentication server and a system and method for managing cryptographic keys across different combinations of user terminals, access networks, and core networks. The invention meets all of the 3GPP EPS requirements listed above primarily by providing key separation between access networks. This is achieved by first introducing a master key (Mk), which is used to derive keys during the authentication procedure. During handover between the different access types, the Mk or a transformed Mk, is passed between two nodes that hold the key in the respective access networks when the UE changes access. The transformation of the Mk is performed via a one-way function, and has the effect that if the Mk is somehow compromised, it is not possible to automatically obtain access to previously used master keys. The Mk is never used directly, but is only used to derive the keys that are directly used to protect the access link.

Figure 2:
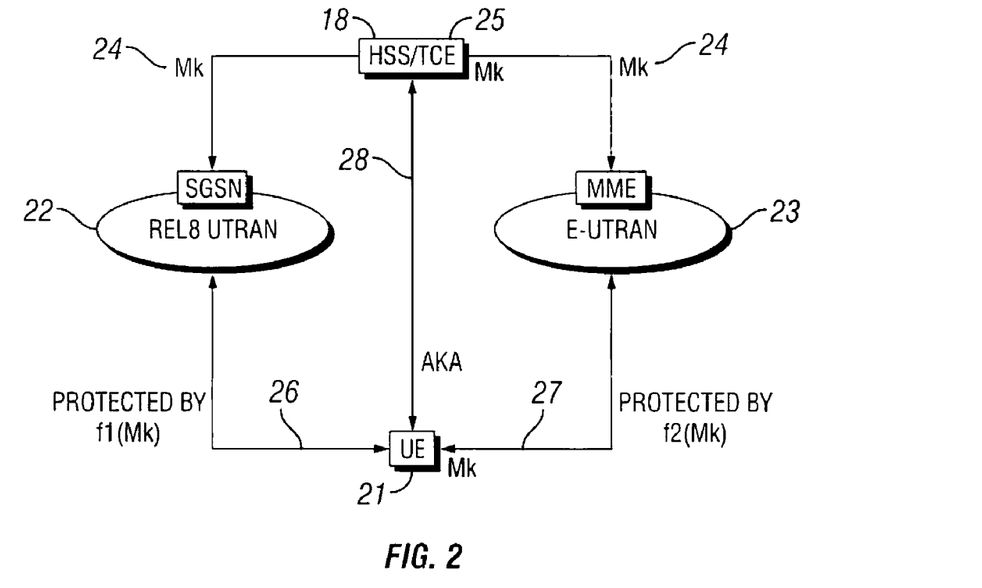
FIG. 2 is a simplified block diagram illustrating the basic principal of the present invention in an exemplary embodiment.

FIG. 2 is a simplified block diagram illustrating the basic principal of the invention in an exemplary embodiment. In this example, a UE 21 accesses a Rel8 UTRAN 22 and an E-UTRAN network 23. The Mk 24 is disseminated to the UTRAN and the E-UTRAN network from a function close to the Home Subscriber Subsystem (HSS) 18 called a Transformation Coder Entity (TCE) 25. The TCE is a logical function, which in one embodiment may be co-located with the HSS. The Mk may be different for each access type. In a Rel8 UTRAN, the Mk is transformed with a function f1, and f1(Mk) 26 is shared with the UE, while for E-UTRAN, the Mk is transformed with a function f2, and f2(Mk) 27 is shared with the UE. In one embodiment, f1 equals f2, while in another embodiment, f1 and f2 are different functions. The TCE 25 generates authentication data for the UE using Authentication and Key Agreement (AKA) 28.

In addition to key separation, the system also enables application servers and applications running on the UE to obtain and utilize a special application key. The application key may be derived/stored by the TCE or the HSS.

Figure 3:
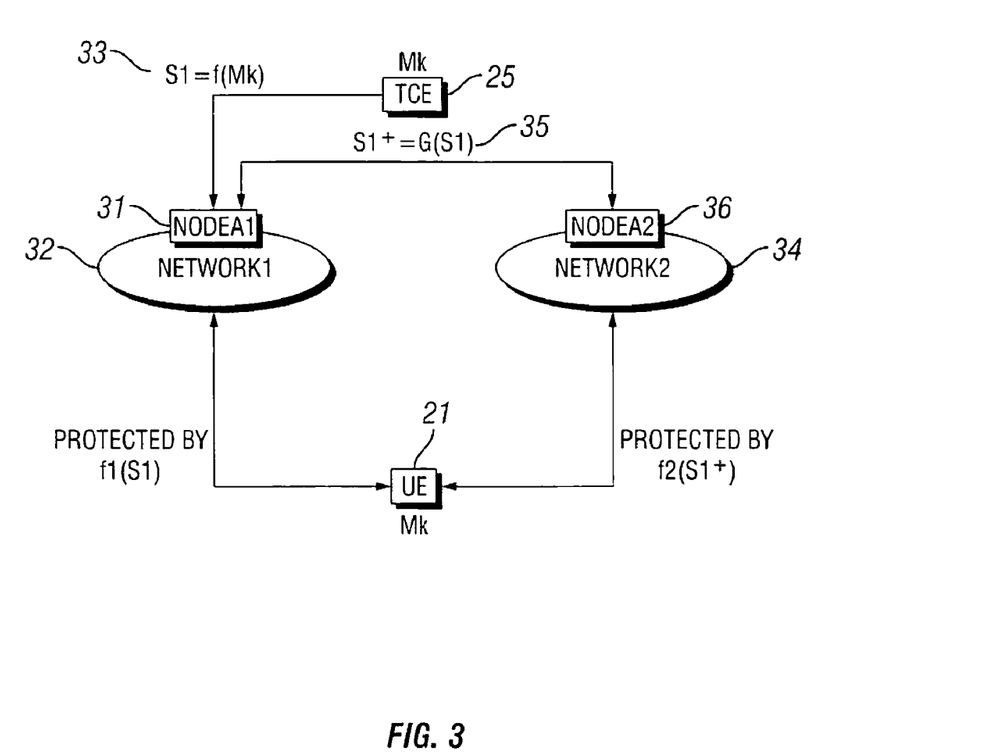
FIG. 3 is a simplified block diagram illustrating how a master key (Mk) is stored in a Transformation Coder Entity (TCE) and how key separation is achieved.

FIG. 3 is a simplified block diagram illustrating how the master key (Mk) 24 is stored in the TCE 25 and how key separation is achieved. The event flow in the figure is as follows:

1. NodeA1 31 in Network1 32 requests an authentication vector (AV) from the TCE 25.
 2. The TCE transforms the Mk in the AV using either a one-way function (known to the UE 21) or identity mapping to obtain S1=f(Mk) 33. The TCE stores the Mk to be used as a key that can be used to derive further keys for the application layer for the UE.
 3. The TCE sends S1 to the NodeA1.
 4. NodeA1 runs AKA against the UE, and the UE locally derives both Mk and S1. NodeA1 derives necessary traffic protection keys from S1 and forwards these to the nodes that require them. This is indicated by the f1 function in FIG. 3. The UE derives the corresponding keys as well.
 5. Next, the UE 21 performs a handover to access type2 (Network 2) 34. Then NodeA1 applies the one-way function G to the key S1 and sends the result, S1$^+$=G(S1) 35, to NodeA2 36. The UE likewise transforms S1 using the G function.
 6. NodeA2 and the UE derive the necessary keys required to protect the traffic in the new access network. If Network2 is of a different type of access network compared to Network1, NodeA2 and the UE may perform other key derivations than those performed by NodeA1. This is indicated by the function f2 in the figure. If the two networks are of the same type, f1 is equal to f2, and G will assure that the keys used on the different networks are different. If the two networks are different, f1 and f2 may derive cryptographically separated keys as is, and G may be implemented by the identity mapping. Note, however, that G adds the feature that if S1 is compromised, it is not possible to recover any past encrypted traffic. Only future traffic is compromised.

If the UE 21 hands over to yet another network, steps 5 and 6 are repeated.

As will be detailed below, the key derivations and transformations must be designed with great care, to allow backwards compatibility with legacy systems. The invention will be described in the context of UTRAN Rel6, UTRAN Rel8, and E-UTRAN herein, but it should be understood that this description is merely an example of the present invention.

There are two sets of "security data" to be considered. The Authentication Vectors (AVs) contain security data and keys that have not yet been used. AVs are transferred from the HSS to an SGSN or MME (note that the SGSN or MME may be located in a visited network) at initial authentication, and one AV is "consumed" at each subsequent authentication. At authentication, unused AVs stored in the SGSN or MME the UE was latest authenticated by, may be requested by the authenticating entity and are then transferred. The AVs in the present invention have a format similar to that of UMTS: (RAND, XRES, AUTN, "key"). In UMTS, "key" is simply Ck, Ik, but henceforth this key material will be referred to as "S".

For the purpose of the invention, the security context contains the currently "active" keys. The security context may also contain other data which are not essential to the invention. To allow handover without an explicit (re-)authentication, the security context is transferred from source to target system.

To capture problems with key-use across different accesses, the following definitions are utilized:

A security context/AV is referred to as "Dirty" if its keying material (S) has been or can later be directly (without further cryptographic safeguard) used as [Ck, Ik] (UTRAN) or Kc (GERAN). Note that it is possible (but not recommended) to use a dirty context in E-UTRAN.

A security context/AV is referred to as "Clean" if [CK, Ik] or Kc or the corresponding keys in E-UTRAN have been/will be derived from its keying material (S) by application of a secure cryptographic "tweaking" function.

To describe a complete solution, three issues must be addressed:

1. How AVs are generated and transported from the HSS to the SGSN/MME at initial authentication (FIGS. 4-7 and Table 1).
2. How (unused) AVs are transferred and transformed at handovers (FIG. 8 and Table 2).
3. How the currently used security context is transferred and transformed at handover (FIG. 9).

The following assumptions are made regarding Authentication and Key Agreement (AKA) procedures:

A Rel8 UE will know if it performs AKA towards a Rel6 SGSN, Rel8 SGSN, or an MME. If the AKA is performed against a Rel6 SGSN, the security context will be dirty; otherwise the security context will be clean. This process is similar to the current GSM/UMTS interworking when the UE must know whether to perform UMTS AKA (Rel99+SGSN) or GSM AKA (Rel98–SGSN).

A Rel6 UE will not be able to distinguish a Rel8 SGSN from a Rel6 SGSN.

The HSS will know the SIM (xSIM or USIM) version. It is assumed that this knowledge can be transferred to network nodes in the vicinity of the HSS (for example, from IMSI or explicit signaling). It is also necessary that the information be passed on to (and between) Rel8 SGSNs/MMEs.

The SGSN/MME will know the AKA capabilities of the UE. This information is assumed (as today) retrieved from the classmark information sent from the UE at network attach and/or information from the HSS. Note that a Rel6 SGSN will only recognize that a Rel8 UE is capable of Rel6 UMTS AKA.

The xSIM will have two logical I/O interfaces, telling the xSIM whether it is used as a "real" Rel8 xSIM, or whether it is used in a legacy Rel6 UE, thus needing to simulate a USIM. Conversely, a Rel8 UE can be assumed able to distinguish xSIM from USIM.

By the definitions of Clean/Dirty above, the present invention satisfies the following:

If AKA is performed towards a (EPS) MME, then a Rel8 UE must be in use, and a clean context can be established for both xSIM and USIM.

If AKA is performed towards a Rel8 SGSN, the context will be clean or dirty depending on the UE capabilities (Rel8 or Rel6).

If AKA is performed towards a Rel6 SGSN, the context will always be dirty. In the case of an xSIM, it will know if this happens and can take measures as described below.

The following are assumptions (or consequences of the above) for context transfers between source/target access systems:

A security context handled in a Rel6 SGSN is (by definition) "Dirty".

At handover, a source MMEs or Rel8 SGSNs will know (since they can be assumed to contain new functionality) whether a security context is transferred to a Rel6 SGSN, Rel8 SGSN, or a MME target. Context transformations by the source system will depend on the situation.

At handover, a target MMEs or Rel8 SGSNs will similarly know if a security context comes from a Rel6 SGSN, Rel8 SGSN, or an MME source.

Only a Rel8 SGSN source can perform handover to a target E-UTRAN system and transfer a security context to a MME because new signaling (not present in a Rel6 SGSN) is required.

MMEs and Rel8 SGSNs can indicate whether the security context is "Clean" or "Dirty" when transferred between them (by explicit signaling). This is an "optimal" case since both source and target systems can support new functionality.

A Rel8 UE can determine that a handover is between a Rel8 SGSN and a MME because the UE is aware that the radio technology changes. There may also be explicit signaling added, though probably not necessary. The same cannot be assumed for handover between a Rel6 SGSN and a Rel8 SGSN because the UE is still in the UTRAN. In one embodiment, the invention is further improved by new signaling enabling the UE to determine whether a handover is between a Rel6 SGSN and a Rel8 SGSN.

In the description below, the designations F1, F2, and G denote suitable cryptographic functions mapping 256 bits to 256 bits. It should be noted that the bit-length may be of a length other (longer or shorter) than 256 bits, but 256 bits is the current working assumption in 3GPP SA3. From these key bits, additional keys can be derived. F3 is a function for mapping 256 bits to a set of (up to) six 256-bit strings. (The presence of the sixth string depends on whether the access technology implements user-pane integrity, which is not the case for E-UTRAN.) (Alternatively, F3 may be implemented using a set of six different functions.) While the F-functions are applied to (unused) AVs, the G-function is applied to active security contexts. Note that F2 and F3 are also used on security contexts, as described below.

In FIGS. 4-7, the security contexts and AVs are represented by the keys S1, S2, and S, because these are the only parameters that are affected by the key derivations. A hierarchy of (at least) four levels of keys is introduced, where a "lower" key is derived from a "higher" key. All the bullets below apply when an xSIM is used:

K is the internal xSIM/HSS key.

S is derived from K at AKA and may be considered a "super key" that is never exposed outside the HPLMN or xSIM. S is similar in function to the key created by an initial 3GPP Generic Bootstrapping Architecture (GBA) procedure.

S1 is a "master session key", derived from S using F1, and is used by the Rel8 SGSN and EPS MMEs to derive session keys.

S2 is a session key derived from S1 using F2.

For E-UTRAN, up to six traffic keys are needed (integrity/confidentiality keys for UP, NAS, and RRC). These further keys are derived from S2 by a function F3.

For Rel6/Rel8 UMTS, S2 corresponds to the two traffic keys (Ck, Ik) used in Rel8 or Rel6.

On the terminal side, if a USIM is used rather than xSIM in a Rel8 UE, the UE can still "emulate" lower keys (similar to the manner in which a UMTS UE emulates the USIM functionality for a SIM). However, if the UE is a Rel6 UE, it cannot. In this case S, will simply be the Ck∥Ik directly output by the USIM as described below.

Similarly, on the network side, in some cases, the key hierarchy above will be "collapsed" due to certain legacy systems not supporting the functions F1, F2, and F3. More particularly, this is due to the fact that F1, F2, and F3 can be thought of as "trivial" functions in a Rel6 system (for example, F2(x)=x, the identity). A Rel8 UE/xSIM must adapt to this situation.

Thus, there are many cases of compatibility that must be considered. The following figures illustrate case-by-case descriptions of key/AV processing at (initial) authentication time for the four possible variations of SIM/UE combinations in the three cases for the network side (Rel6, Rel8, or MME). First, some further notation will be described.

The TCE 25 may be a small shim layer that holds an application key (or master key) S, similar to the Ks in the GBA bootstrapping procedure. The TCE also performs the necessary key derivations depending on the type of SIM in the UE. The TCE may be implemented in the HSS 18 or as a separate entity. Since the TCE does not know the release version of the UE 21, it must send its data based purely on the xSIM/USIM version.

In the above discussion, a distinction is made between Rel6 and Rel8 networks. There are also Rel7 networks which need to interoperate with EPS. At this time, there are no major changes from Rel6 to Rel7 from the security point of view, but Rel7 is not yet completely defined. Thus, if 3GPP Rel7 does not introduce any new key management functionality as discussed above, then any Rel7 3GPP network would interwork with EPS precisely as the Rel6 network does in the discussion above. On the other hand, if Rel7 introduces the new key management functionality assumed for Rel8, then a Rel7 network would interwork with EPS precisely as Rel8 does above. In summary, a Rel7 network interworking with EPS would be handled as a Rel6, or, as a Rel8 network, depending on what new key management functionality that is introduced. The same applies for the discussion in the sequel. The term "Pre-Rel8" is utilized herein to refer to Rel6 nodes or Rel7 nodes that do not introduce the new key management functionality assumed for Rel8 nodes.

The boxes marked "Dirty" and "Clean" in the figures, denote whether the contexts/AVs are clean or dirty as defined above. In the case of a Rel6 SGSN, there is no explicit "flag" telling whether a context/AV is clean or not (as it is always dirty), but this information can be implicitly deduced by the Rel8 SGSN because it received the context/AV from a Rel6 SGSN.

For simplicity, the figures only indicate that the key S2 is transferred to the RNC/eNodeB. It shall be noted that S2 is further processed into traffic keys (Kc for GERAN, CK/IK for UTRAN, and UP/NAS/RRC keys for E-UTRAN) using the F-functions. Since the endpoints for the protection are different in EPS for different types of traffic, the processing may preferably be carried out in the MME and be sent to the protection endpoint (eNodeB), or the eNodeB can derive the UP/RRC keys by itself if given S2. For UMTS, CK and IK can be taken as the first and second half of S2 respectively.

Processing is first described for keys being part of AVs in the HSS/SGSN/MME and for keys SIM/UE at (initial) authentication. It should be noted that FIGS. 4-7 show explicit authentication. Implicit authentication accomplished by context transfer is discussed later.

Figure 4:
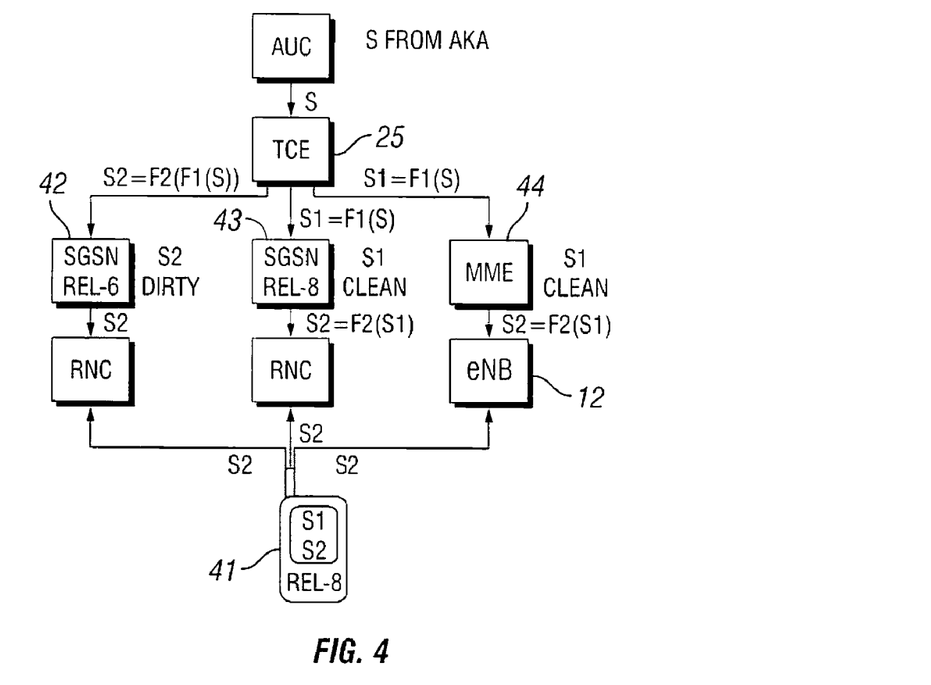
FIG. 4 is a simplified block diagram illustrating initial authentication of a Rel8 UE utilizing an xSIM.

FIG. 4 is a simplified block diagram illustrating initial authentication of a Rel8 UE 41 utilizing an xSIM. The bootstrapping function (BSF) sees an xSIM, not the UE release. The BSF also knows the SGSN release or if an MME is utilized. The TCE 25 sends S2=F2(F1(S)) to the Rel6 SGSN 42, and sends S1=F1(S) to the Rel8 SGSN 43 and the MME 44. Note that S2 is processed to derive traffic protection keys, for example CK/IK in a UTRAN. Since the UE can differentiate between a Rel6 SGSN 42, a Rel8 SGSN 43, and an MME 44 for AKA, it keeps track of whether the security context is dirty or clean (i.e., whether the network has a S1-key stored in the SGSN/MME). If the UE communicates with the Rel6 SGSN 42, the UE marks the context as dirty. If the UE talks to the Rel8 SGSN 43 or the MME 44, the UE marks the context as clean. Note that the UE always uses S2 (or lower, F3-derived keys) to protect the traffic. This allows for transfer of AVs between SGSNs/MMEs. A Rel 8 UE with an xSIM can adapt to the capabilities of the AKA endpoint. The Rel8 SGSN and the MME know the capabilities of the UE.

Figure 5:
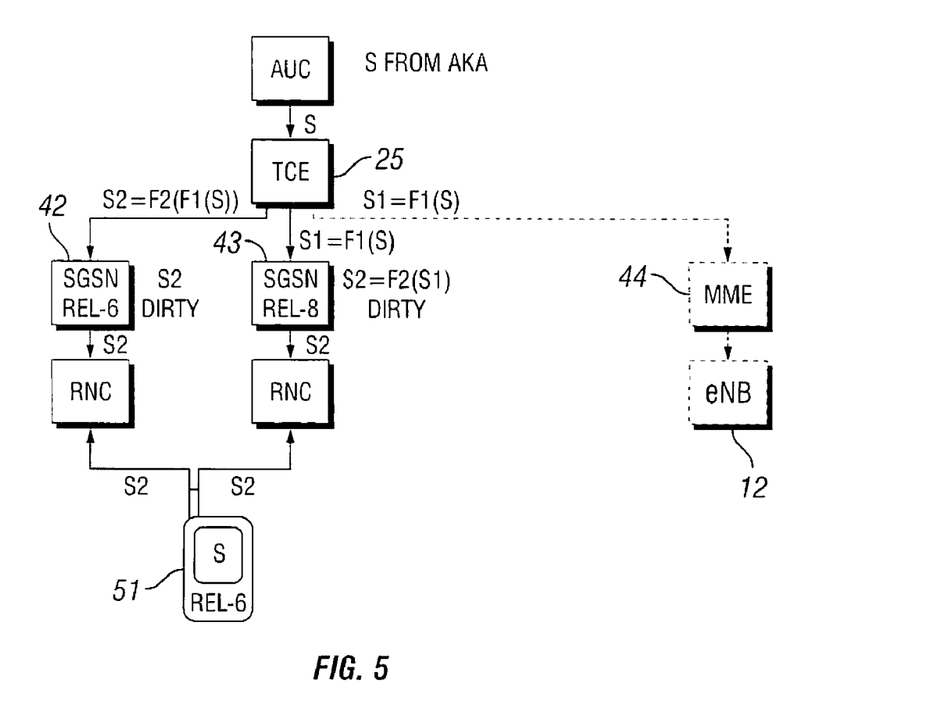
FIG. 5 is a simplified block diagram illustrating initial authentication of a Rel6 UE utilizing an xSIM.

FIG. 5 is a simplified block diagram illustrating initial authentication of a Rel6 UE 51 utilizing an xSIM. Once again, the BSF sees an xSIM, not the UE release. The BSF also knows the SGSN release. The TCE 25 sends S2=F2(F1(S)) to the Rel6 SGSN 42, and sends S1=F1(S) to the Rel8 SGSN 43. Since the UE is Rel6, it cannot hand over to an E-UTRAN network. Therefore, there is no gain in keeping a clean context in the Rel8 SGSN 43 (even though this, in principle, is possible), and the MME 44 does not need to be considered. The xSIM performs the functions S1=F1(S) and S2=F2(S1). A Rel6 UE with a USIM must behave as defined by Release 6; no new features are possible. The Rel8 SGSN must be able to distinguish whether the UE has an xSIM or a USIM to be able to determine if the F2 function should be applied (as is done in this case), or not (see FIG. 6). This information can be passed from the TCE together with the AV. Thus, each AV must carry this information when passed between SGSNs in case provisions for an enhanced xSIM are to be made. Of course, as long as only USIMs are used, this information is not needed.

Figure 6:
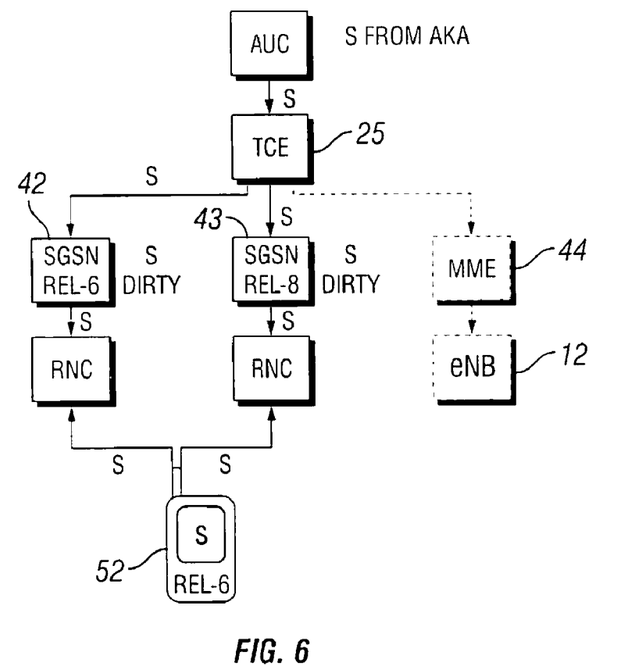
FIG. 6 is a simplified block diagram illustrating initial authentication of a Rel6 UE utilizing a USIM.

FIG. 6 is a simplified block diagram illustrating initial authentication of a Rel6 UE 52 utilizing a USIM. The Rel6 UE with a USIM must behave as defined by Release 6; no new features are possible. The BSF sees a USIM, not the UE release. The BSF also knows the SGSN release. The TCE 25 sends S to the Rel6 SGSN 42 and the Rel8 SGSN 43. Note that S is processed to derive traffic protection keys, for example CK/IK in a UTRAN. The TCE 25 works transparently (i.e., the functionality is the same as in a normal Rel6 network). Again, the Rel8 SGSN 43 does not need to maintain a clean context, and the MME 44 does not need to be considered because the UE cannot hand over to an E-UTRAN network.

Figure 7:
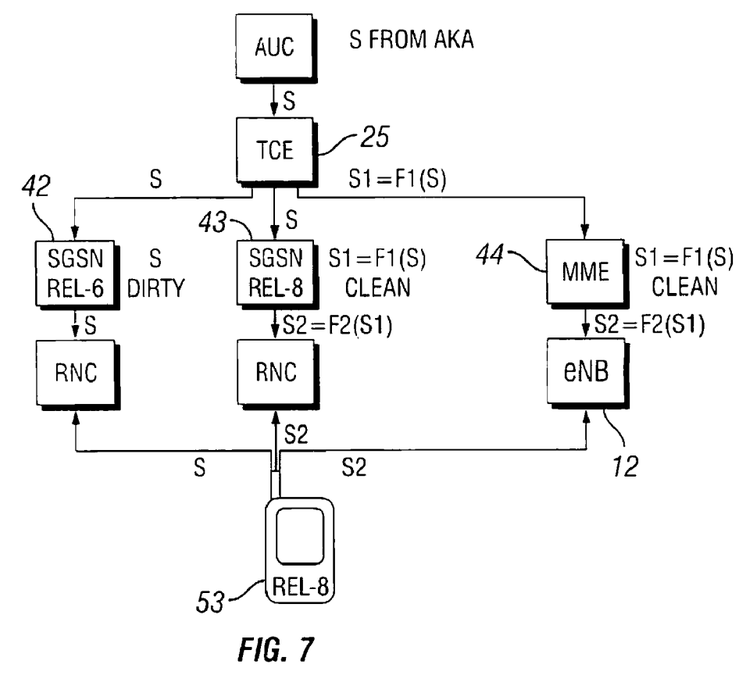
FIG. 7 is a simplified block diagram illustrating initial authentication of a Rel8 UE utilizing a USIM.

FIG. 7 is a simplified block diagram illustrating initial authentication of a Rel8 UE 53 utilizing a USIM. The Rel8 UE with a USIM can adapt to the capabilities of the AKA endpoint. The Rel8 SGSN knows the capabilities of the UE, and S1 is derived internally. The BSF sees a USIM, not the UE release. The BSF also knows the SGSN release or if an MME is utilized. Note that S and S2 are processed to derive traffic protection keys, for example CK/IK in a UTRAN. Note also that the Rel8 UE can differentiate between the Rel6 SGSN 42, the Rel8 SGSN 43, and the MME 44 for AKA. In this case, it is important to note that the UE can attach both to an SGSN and an MME. This is possible to achieve with a USIM when the Rel8 UE has implemented wrapper functionality around it, which performs the necessary key derivations. If the UE communicates with the Rel6 SGSN 42, the UE marks the context as dirty. If the UE talks to the Rel8 SGSN 43 or the MME 44. the UE marks the context as clean.

The wrapper functionality in the UE 53 performs the following actions:
When communicating with the Rel6 SGSN 42, the wrapper functionality performs no extra function, but marks the context as dirty.
When communicating with the Rel8 SGSN 43 or the MME 44, the wrapper functionality computes S1=F1(S) and S2=F2(S1), stores S1, and marks the context as clean. S2 is used to derive the traffic protection keys via the use of F3.

FIGS. 4-7 have illustrated the handling of (initial) authentication according to the teachings of the present invention. The description below describes handover cases and context/AV fetch/transfer between the different systems.

Looking first at AV fetch, AVs may be transferred between different releases of SGSNs and MMEs. The transfer depends on the SIM version and the target/source system release. In particular, to a Rel8 SGSN and MME, the AV must be marked as a USIM or xSIM AV when transferred from the TCE. Table 1 below shows what key is provided to the SGSN/MME from the TCE in an AV.

AV key stored in AV's in the SGSN/MME (when received from the TCE):

TABLE 1

|  | Rel6 SGSN | Rel8 SGSN | MME |
| --- | --- | --- | --- |
| xSIM | S2 | S1 | S1 |
| USIM | S | S | S1 |

Looking next at AV transfer, Table 2 below shows the operations performed by the source and the target SGSNs/MMEs when transferring an AV.

Explanations of the notation in Table 2:
The AVk is the key carried in the AV (AVk may be equal to S, S1, or S2).
S-bit is a bit (or value) that indicates the type of SIM for which the AV, in principle, was generated. When transferred from a Rel6 SGSN, this information is not available and hence the S-bit is then set to "unknown" by the Rel8 SGSN. The S-bit is only necessary if enhanced xSIMs are being supported.
D-bit is the dirty bit. If the D-bit is set, it means that the AVk must not ever be transformed again.
Tx means transfer.

AV Transfers

TABLE 2

| | Source node action | Destination node action |
|---|---|---|
| SGSN Rel6 to SGSN Rel6 | Tx(AVk_src) | AV= (AVk_src) (Legacy Rel6 operation) |
| SGSN Rel6 to SGSN Rel8 or MME | Tx(AVk_src) | AV= (AVk_src, S-bit = unknown, D-bit = true) Note: The D-bit is set, which means that AVk will be used directly by an SGSN Rel8 and an MME. |
| SGSN Rel8 to SGSN Rel6 | If (D-bit == true OR S-bit == USIM) Tx(AVk_src) If (S-bit ==xSIM) Tx (F2(AVk_src)) | AV=(AVk_src) Note: Legacy Rel6 operation. |
| SGSN Rel8 to SGSN Rel8 | Tx(AVk_src, S-bit, D-bit) | AV=(AVk_src, S-bit, D-bit) |
| SGSN Rel8 to MME | Tx(AVk_src, S-bit, D-bit) Note: no transformation to AVk_src is done in the USIM case, since the SGSN Rel8 can not distinguish if the transformation has been performed if the AV is passed back. (CTXk init handles the conversion instead). This restriction is not necessary if more granular key-levels are used than merely a D-bit. | AV=(AVk_src, S-bit, D-bit) |
| MME to MME | Tx(AVk_src, S-bit, D-bit) | AV=(AVk_src, S-bit, D-bit) |
| MME to SGSN Rel6 | Not allowed in preferred embodiment (not possible if MME does not have knowledge of S and the UE has a USIM). | |
| MME to SGSN Rel8 | Tx(AVk_src, S-bit, D-bit) | AV=(AVk_src, S-bit, D-bit) |

Figure 8:
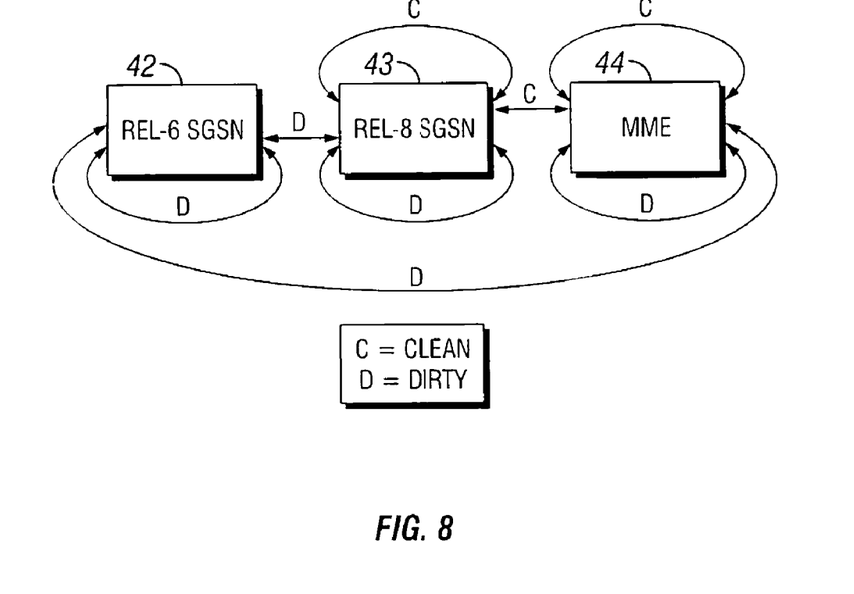
FIG. 8 is a simplified block diagram illustrating the transfer of authentication vectors (AVs) between different systems.
Figure 9:
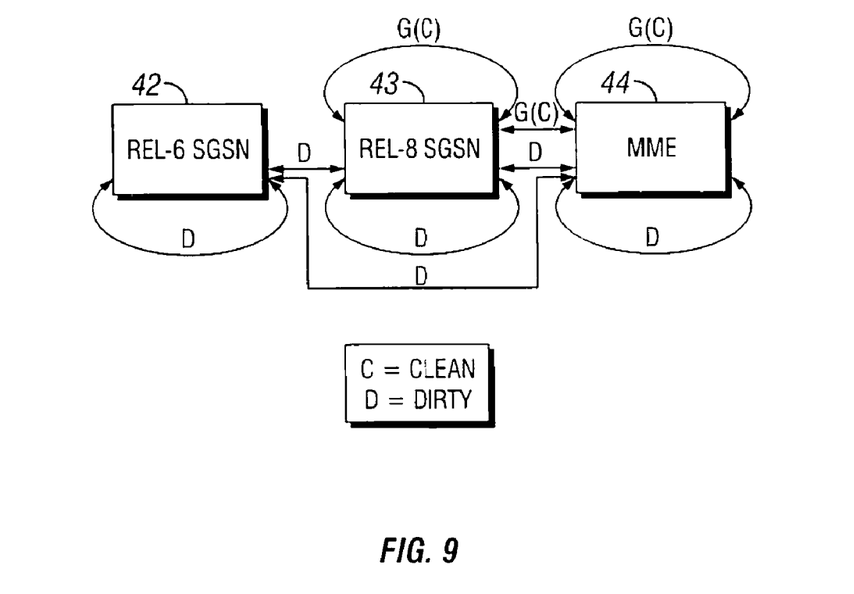
FIG. 9 is a simplified block diagram illustrating the handling of inter-access context transfers when the context is transferred from source to target system and where the transferred keys are put to immediate use by the target system without explicit re-authentication.

FIG. 8 is a simplified block diagram illustrating the transfer of authentication vectors (AVs) between different systems. If there is a clean AV in the Rel8 SGSN 43, it can be transformed into a dirty AV (see Table 2 above) and be sent to the Rel6 SGSN 42. Note that it may be possible to allow the Rel6 SGSN to fetch AVs from the MME 44, but to do so, the MME must have knowledge of the key S (in the case that the UE has a USIM). In another embodiment, the Rel6 SGSN is not allowed to fetch AVs from Rel8 entities. In this case, the Rel8 SGSN may receive S1 if the UE has a USIM (exactly like the MME).

A hypothetical example where a key establishment failure can occur is when a user:

1. Authenticates to the MME using a Rel8 UE and a USIM. The MME downloads a batch of AVs from the TCE containing S1.

2. Next, the user turns off the Rel8 UE, moves the USIM to a Rel6 UE, and tries to authenticate to a Rel6 SGSN.

3. The Rel6 or Rel8 SGSN, may fetch AVs from the MME instead of fetching them from the TCE and then challenge the UE.

4. The authentication will succeed, but the SGSN and the UE will hold different security contexts (link protection keys). The SGSN will hold S2 and the UE will hold S. Note that there may be difficulties in detecting the difference in keys.

To prevent this situation from occurring, the capability to transfer AVs from an MME to a SGSN can be removed. This is a reasonable solution as a seamless handover could still be supported by transferring the active "security context" (keys) and, if needed, later downloading new AVs from the HSS/TCE to the SGSN. Unused AVs in the MME would simply be flushed in this case.

The above problem is a side-effect of the desire to allow all possible combinations of SIMs, UE releases, and network releases without being able to update "legacy" releases. Another possible way to remedy the situation for a Rel8 SGSN by is, for example, to introduce new signaling from a Rel8 UE to the SGSN that tells the type of SIM (USIM/xSIM) used in the UE. This may be done with classmark information or other signaling. If the Rel8 SGSN does not receive this signaling, the SGSN can draw the conclusion that the UE is a Rel6 UE and that a failure will occur.

FIG. 9 is a simplified block diagram illustrating the handling of inter-access context transfers when the context is transferred from source to target system and where the transferred keys are put to immediate use by the target system without explicit re-authentication. The function "G" is utilized for this purpose. For contexts that are still clean (i.e., inter/intra Rel8 SGSN and MME transfers), G is always applied to the S1 key to preserve "cleanliness". Contexts that are already dirty are not processed. In other words, for dirty contexts, the S2 key is passed as is. Note that it may be possible in some cases to process a dirty context, but doing so does not offer any significant extra protection. A transfer to a Rel6 SGSN is never processed by G, although in principle, it would be possible to do so by introducing new signaling. This signaling would be needed at Rel8/Rel6 handovers to tell the UE to perform similar processing. Otherwise, the UE would not be aware of the transfer and would use the wrong key.

F1, F2, F3, and G are cryptographic functions. They can all be implemented by standard building blocks such as, for example, the Advanced Encryption Standard (AES), the SHA256 algorithm, and the like. F1, F2, F3, and G should at least be (strong) one-way functions and should preferably be pseudo-random functions. F3 furthermore needs for EPS networks to produce up to six keys. This may be done using a "label" such as key=F3(S1, <label>), where label takes on distinct values for the distinct keys. In this case, F3 should be a pseudo-random function. The function F3 is preferably also made dependent on the "ID" of the algorithm with which the keys are to be used.

If the UE "ping-pongs" between a Rel8 SGSN and an MME, note that G may be applied several times. G should then preferably have the property that it does not degenerate when iterated. One way to achieve this is to further assume that G is a pseudo-random permutation. One could then have, for example:

$$\text{target\_system\_S1} = G(\text{source\_system\_S1}, c, \ldots),$$

where c is a counter that increases at each "ping" or "pong". Other inputs such as system ID may also be included.

Several enhancements may also be made for Rel6/Rel8 handovers. First, new signaling is introduced from a Rel8 SGSN to a Rel8 UE that tells the UE that it is being handed over to/from a Rel6 SGSN. The solution can then be further improved as discussed above by also applying G at Rel6/Rel8 SGSN handover. Since the UE is now aware of this situation by explicit signaling, the UE and the Rel8 SGSN can apply the function G as required in full synchronization.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. Moreover, while the description has focused on interworking between E-UTRAN and UTRAN networks, the principles of key separation would be equally applicable (and useful) for interworking between E-UTRAN and any non-3GPP accesses technology (e.g. CDMA2000, IEEE 802.11, 802.16, etc), or, between any two non-3GPP networks. The specification contemplates any all modifications that fall within the scope of the invention defined by the following claims.

What is claimed is:

1. A method in an authentication server in a serving core network for distributing authentication data to a given authenticator node, said given authenticator node being one of a plurality of authenticator nodes of different types, wherein the authenticator nodes authenticate different versions of identity modules utilized in a plurality of different versions of mobile terminals, said method comprising the steps of:
    the authentication server generating a master key;
    the authentication server cryptographically deriving from the master key, different authentication data utilizing a key-separation process, wherein a different transformed key is derived for each different combination of authenticator node type and identity module version; and
    the authentication server selectively providing to the given authenticator node, authentication data derived for the combination of the given authenticator node type and the version of identity module being authenticated by the given authenticator node thereby providing key separation for keys provided by the authentication server.

2. The method as recited in claim 1, wherein the plurality of authenticator nodes includes a Release Eight Serving GPRS Service Node (Rel8 SGSN), a Pre-Release Eight SGSN (Pre-Rel8 SGSN), and an EPS Mobility Management Entity (MME).

3. The method as recited in claim 2, wherein the versions of terminals include 3GPP Release Eight User Equipments (Rel8 UEs) and Pre-Rel8 UEs.

4. The method as recited in claim 3, wherein the identity modules comprise a UMTS Subscriber Identity Module (USIM) and an extended SIM/USIM (xSIM).

5. A method in an authentication server for distributing authentication data to a given authenticator node, said given authenticator node being one of a plurality of authenticator nodes of different types, wherein the authenticator nodes authenticate different versions of identity modules utilized in a plurality of different versions of mobile terminals, said method comprising the steps of:
    generating a master key in the authentication server;
    cryptographically deriving from the master key, different authentication data utilizing a key-separation process, wherein a different transformed key is derived for each different combination of authenticator node type and identity module version; and
    selectively providing to the given authenticator node, authentication data derived for the combination of the given authenticator node type and the version of identity module being authenticated by the given authenticator node;
    wherein the plurality of authenticator nodes includes a Release Eight Serving GPRS Service Node (Rel8 SGSN), a Pre-Release Eight SGSN (Pre-Rel8 SGSN), and an EPS Mobility Management Entity (MME);
    wherein the identity modules comprise a UMTS Subscriber Identity Module (USIM) and an extended SIM/USIM (xSIM);
    wherein the versions of terminals include 3GPP Release Eight User Equipments (Rel8 UEs) and Pre-Rel8 UEs; and
    wherein the step of providing the derived authentication data to the given authenticator node includes sending information to the given authenticator node indicating the version of identity module being utilized in each mobile terminal being authenticated.

6. An authentication server for distributing authentication data to a given authenticator node, said given authenticator node being one of a plurality of authenticator nodes of different types, wherein the authenticator nodes authenticate different versions of identity modules utilized in a plurality of different versions of mobile terminals, said authentication server comprising:
    means for generating a master key;
    key-separation means for cryptographically deriving from the master key, different authentication data for each different combination of authenticator node type and identity module version; and
    means for providing to the given authenticator node, authentication data derived for the combination of the given authenticator node type and the version of identity module being authenticated by the given authenticator node.

7. The authentication server as recited in claim 6, wherein the key-separation means includes means for cryptographically deriving from the master key, a different transformed key for each different combination of authenticator node type and identity module version.

8. The authentication server as recited in claim 7, wherein the plurality of authenticator nodes includes a Release Eight Serving GPRS Service Node (Rel8 SGSN), a Pre-Release Eight SGSN (Pre-Rel8 SGSN), and an EPS Mobility Management Entity (MME).

9. The authentication server as recited in claim 8, wherein the identity modules comprise a UMTS Subscriber Identity Module (USIM) and an extended SIM/USIM (xSIM).

10. An authenticator node for receiving authentication data from an authentication server and authenticating a mobile terminal, wherein the authenticator node is of a given type and the mobile terminal includes an identity module of a given version, said authenticator node comprising:
means for receiving the authentication data from the authentication server and storing a first key being part of the authentication data, wherein the authentication data is derived for the combination of the authenticator node type and the version of identity module being authenticated by the given authenticator node;
first key-separation means for cryptographically deriving a second key from the first key received from the authentication server;
authentication means for authenticating the mobile terminal;
means for communicating the second key with a plurality of other authenticator nodes of different types;
second key-separation means for cryptographically deriving a third key from the first key; and
means for communicating the third key to a security processing node, said security processing node communicating with the mobile terminal utilizing the third key.

11. The authenticator node as recited in claim 10, wherein the first key-separation means is adapted to cryptographically derive different second keys for 3GPP Release Eight Serving GPRS Service Nodes (Rel8 SGSNs), Pre-Release Eight SGSNs (Pre-Rel8 SGSNs), and EPS Mobility Management Entities (MMES).

12. An authenticator node for receiving authentication data from an authentication server and authenticating a mobile terminal, said authenticator node comprising:
means for receiving the authentication data and storing a first key being part of the authentication data;
first key-separation means for cryptographically deriving a second key from the first key, wherein the first key-separation means is adapted to cryptographically derive different second keys for 3GPP Release Eight Serving GPRS Service Nodes (Rel8 SGSNs), Pre-Release Eight SGSNs (Pre-Rel8 SGSNs), and EPS Mobility Management Entities (MMES);
authentication means for authenticating the mobile terminal;
means for communicating the second key with a plurality of other authenticator nodes of different types, wherein the means for communicating the second key with the plurality of other authenticator nodes also sends information whether or not the second key can be used later without further cryptographic safeguard when the other authenticator node is a Rel8 SGSN or MME;
second key-separation means for cryptographically deriving a third key from the first key; and
means for communicating the third key to a security processing node, said security processing node communicating with the mobile terminal utilizing the third key.

13. An authenticator node for receiving authentication data from an authentication server and authenticating a mobile terminal, said authenticator node comprising:
means for receiving the authentication data and storing a first key being part of the authentication data;
first key-separation means for cryptographically deriving a second key from the first key;
authentication means for authenticating the mobile terminal;
means for communicating the second key with a plurality of other authenticator nodes of different types, wherein the means for communicating the second key with the plurality of other authenticator nodes also sends information indicating a version of identity module being utilized in the mobile terminal, thereby enabling synchronization of key-separation functions between the other authenticator nodes and the mobile terminal;
second key-separation means for cryptographically deriving a third key from the first key; and
means for communicating the third key to a security processing node, said security processing node communicating with the mobile terminal utilizing the third key.

14. A system for sharing authentication data between an authentication server and a plurality of authenticator nodes of first, second, and third types in different access networks, wherein the authenticator nodes authenticate different versions of identity modules utilized in a plurality of different versions of mobile terminals, said system comprising:
in the authentication server:
means for generating a master key;
first key-separation means for cryptographically deriving from the master key, a different transformed key for each different combination of authenticator node type and identity module version; and
means for providing to an authenticator node of a given type, the transformed key derived for the combination of the given type of authenticator node and the version of identity module being authenticated by the given authenticator node; and
in each of the plurality of authenticator nodes:
means for receiving a request for authentication data from another authenticator node; and
means for transferring the transformed key to the requesting authenticator node.

15. The system as recited in claim 14, wherein the first, second, and third types of authenticator nodes are 3GPP Release 8 Serving GPRS Service Nodes (Rel8 SGSNs), Pre-Release Eight SGSNs (Pre-Rel8 SGSNs), and EPS Mobility Management Entities (MMES).

16. The system as recited in claim 15, wherein each Rel8 SGSN and MME includes second key-separation means for cryptographically processing the transformed key before transferring the cryptographically processed transformed key to the requesting authenticator node.

17. The system of claim 16 wherein each Rel8 SGSN and MME includes third key-separation means for processing the first key before transferring it to a security processing node communicating securely with the mobile terminal.

18. A system for sharing authentication data between an authentication server and a plurality of authenticator nodes of first, second, and third types in different access networks, wherein the authenticator nodes authenticate different versions of identity modules utilized in a plurality of different versions of mobile terminals, said system comprising:
in the authentication server:
means for generating a master key;
first key-separation means for cryptographically deriving from the master key, a different transformed key for each different combination of authenticator node type and identity module version; and
means for providing to an authenticator node of a given type, the transformed key derived for the combination of the given type of authenticator node and the version of identity module being authenticated by the given authenticator node; and
in each of the plurality of authenticator nodes:
means for receiving a request for authentication data from another authenticator node; and means for transferring the transformed key to the requesting authenticator node;
wherein the first, second, and third types of authenticator nodes are 3GPP Release 8 Serving GPRS Service Nodes (Rel8 SGSNs), Pre-Release Eight SGSNs (Pre-Rel8 SGSNs), and EPS Mobility Management Entities (MMES);
wherein each Rel8 SGSN and MME includes:
second key-separation means for cryptographically processing the transformed key before transferring the cryptographically processed transformed key to the requesting authenticator node; and
means for maintaining a marker associated with received authentication data, said marker containing information on the source of the authentication data.

19. The system as recited in claim 18, wherein the authenticator nodes are adapted to cryptographically derive different transformed keys for 3GPP Release Eight Serving GPRS Service Nodes (Rel8 SGSNs), Pre-Release Eight SGSNs (Pre-Rel8 SGSNs), and EPS Mobility Management Entities (MMES).

20. The system as recited in claim 19, wherein the means within the authenticator node for transferring the transformed key to the requesting authenticator node also sends information indicating whether or not the transformed key can be used later without further cryptographic safeguard when the requesting authenticator node is a Rel8 SGSN or MME.

21. A system for sharing authentication data between an authentication server and a plurality of authenticator nodes of first, second, and third types in different access networks, wherein the authenticator nodes authenticate different versions of identity modules utilized in a plurality of different versions of mobile terminals, said system comprising:
in the authentication server:
means for generating a master key;
first key-separation means for cryptographically deriving from the master key, a different transformed key for each different combination of authenticator node type and identity module version; and
means for providing to an authenticator node of a given type, the transformed key derived for the combination of the given type of authenticator node and the version of identity module being authenticated by the given authenticator node; and
in each of the plurality of authenticator nodes:
means for receiving a request for authentication data from another authenticator node; and
means for transferring the transformed key to the requesting authenticator node, wherein the transferring means also sends information indicating the version of identity module being utilized in a mobile terminal being authenticated.

22. A system for sharing authentication data between an authentication server and a plurality of authenticator nodes of first, second, and third types in different access networks, wherein the authenticator nodes authenticate different versions of identity modules utilized in a plurality of different versions of mobile terminals, said system comprising:
in the authentication server:
means for generating a master key;
first key-separation means for cryptographically deriving from the master key, a different transformed key for each different combination of authenticator node type and identity module version; and
means for providing to an authenticator node of a given type, the transformed key derived for the combination of the given type of authenticator node and the version of identity module being authenticated by the given authenticator node, wherein the providing means also sends information indicating the version of identity module for which the transformed key was derived; and
in each of the plurality of authenticator nodes:
means for receiving a request for authentication data from another authenticator node; and
means for transferring the transformed key to the requesting authenticator node.

* * * * *

UNITED STATES PATENT AND TRADEMARK OFFICE
CERTIFICATE OF CORRECTION

PATENT NO. : 8,094,817 B2
APPLICATION NO. : 11/857621
DATED : January 10, 2012
INVENTOR(S) : Blom et al.

Page 1 of 1

It is certified that error appears in the above-identified patent and that said Letters Patent is hereby corrected as shown below:

In Column 6, Line 24, delete "[Ck. Ik]" and insert -- [Ck, Ik] --, therefor.

In Column 9, Line 53, delete "TCE" and insert -- TCE 25 --, therefor.

In Column 15, Line 29, in Claim 11, delete "(MMES)." and insert -- (MMEs). --, therefor.

In Column 15, Line 41, in Claim 12, delete "(MMES);" and insert -- (MMEs); --, therefor.

In Column 16, Line 38, in Claim 15, delete "(MMES)." and insert -- (MMEs). --, therefor.

In Column 17, Line 7, in Claim 18, delete "(MMES);" and insert -- (MMEs); --, therefor.

In Column 17, Line 22, in Claim 19, delete "(MMES)." and insert -- (MMEs). --, therefor.

Signed and Sealed this
Fourth Day of September, 2012

David J. Kappos
*Director of the United States Patent and Trademark Office*